United States Patent [19]
Williams et al.

[11] Patent Number: 6,092,143
[45] Date of Patent: Jul. 18, 2000

[54] MECHANISM FOR SYNCHRONIZING SERVICE OF INTERRUPTS BY A PLURALITY OF DATA PROCESSORS

[75] Inventors: Robert A. Williams, Cupertino; Pierre Haubursin, Sunnyvale; Din-I Tsai, Fremont, all of Calif.

[73] Assignee: Advanced Micro Devices, Inc., Sunnyvale, Calif.

[21] Appl. No.: 09/175,709

[22] Filed: Oct. 20, 1998

[51] Int. Cl.$^7$ ........................................... G06F 9/48
[52] U.S. Cl. .................. 710/266; 710/267; 710/260; 712/244
[58] Field of Search ..................... 710/266, 269, 710/263, 48, 49, 260, 261, 262, 267; 711/100; 712/244, 1; 713/400

[56] References Cited

U.S. PATENT DOCUMENTS

| | | |
|---|---|---|
| 4,261,034 | 4/1981 | Saccomano et al. . |
| 5,560,019 | 9/1996 | Narad . |
| 5,640,528 | 6/1997 | Harney et al. . |
| 5,815,733 | 9/1998 | Anderson et al. . |
| 6,021,458 | 2/2000 | Jayakumar et al. . |

*Primary Examiner*—Gopal C. Ray
*Attorney, Agent, or Firm*—Monica H. Choi

[57] ABSTRACT

An apparatus and method ensure that only one data processor, within a multiprocessor system, performs operations associated with an interrupt register having information corresponding to a particular interrupt. An interrupt register from a plurality of interrupt registers is selected via an address decoder, and data bits from the selected interrupt register are steered to a data bus. Each interrupt register has a corresponding trailing edge detector which clears the data content of the interrupt register after a first one of a plurality of data processors has read the data bits of that interrupt register on the data bus to service that particular interrupt. In this manner, a second one of the data processors which also attempts to service that particular interrupt reads the cleared content of that interrupt register. Upon reading the cleared content of that interrupt register, the second one of the data processors is alerted to return to a foreground task since that particular interrupt has already been serviced. The present invention also provides an option for not clearing an interrupt register. In addition, the present invention may include a mechanism for processing interrupt information data bit portions at a time by data type within an interrupt register.

18 Claims, 5 Drawing Sheets

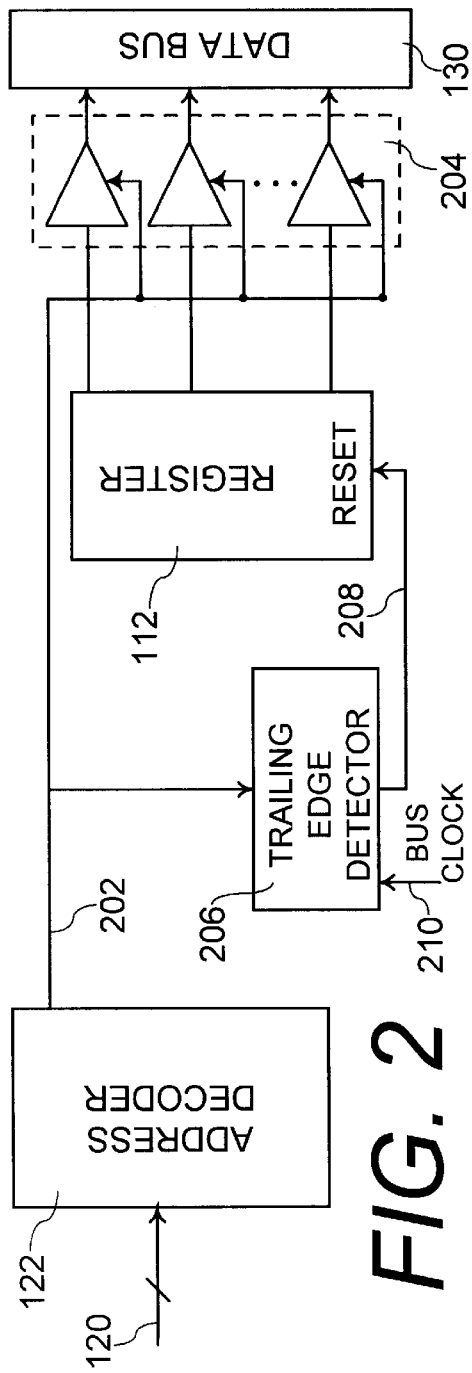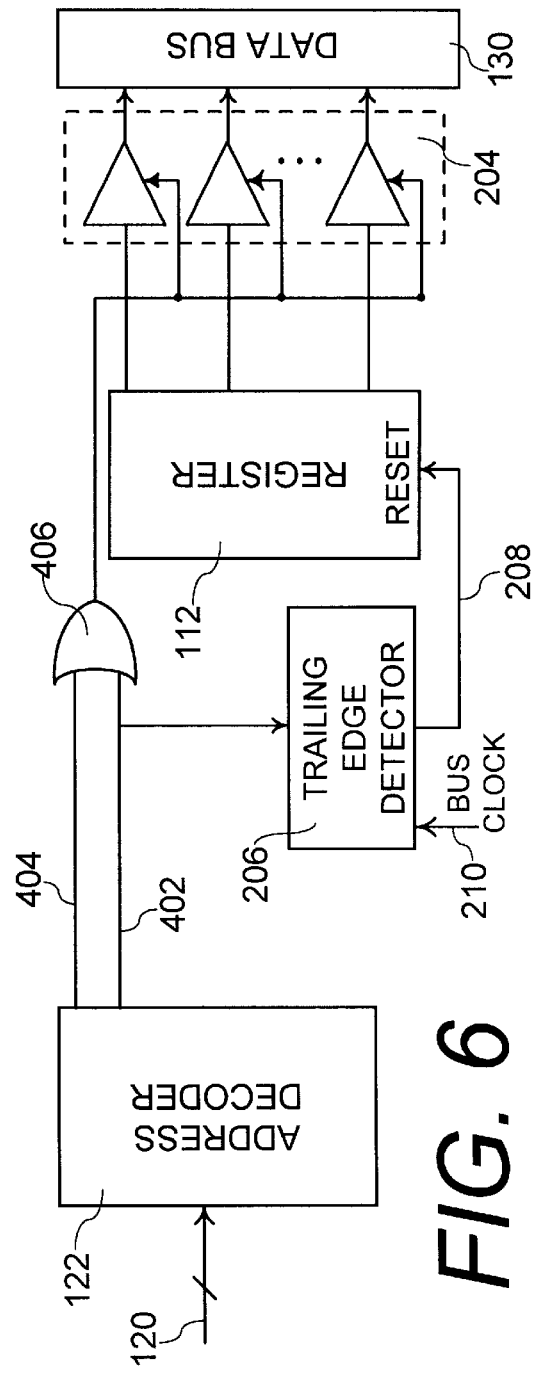

6,092,143

MECHANISM FOR SYNCHRONIZING SERVICE OF INTERRUPTS BY A PLURALITY OF DATA PROCESSORS

TECHNICAL FIELD

This invention relates to digital electronic systems, and more particularly, to an apparatus and method for preventing service of the same interrupt by more than one data processor within a multiprocessor system.

BACKGROUND OF THE INVENTION

When an interrupt is generated within an electronic system, a data processor within the electronic system services the interrupt. That data processor accesses an appropriate interrupt register for information regarding that interrupt such that the data processor may perform appropriate operations in servicing that interrupt.

Referring to FIG. 1, an electronic system 100 is a multiprocessor electronic system and includes a first data processor 102, a second data processor 104, and a third data processor 106. The data processors 102, 104, and 106 service interrupts generated by any sources known to one of ordinary skill in the art of digital system design. Having a plurality of data processors 102, 104, and 106 speeds up the service of interrupts. The plurality of data processors 102, 104, and 106 may be comprised of any type of data processors as known to one of ordinary skill in the art of digital system design.

For example, the electronic system 100 may be part of a computer network peripheral device which interfaces a computer host system having the data processors 102, 104, and 106 to a network of computers. In that case, an interrupt is generated whenever a data packet has been received from the network of computers and needs to be processed by at least one of the plurality of data processors 102, 104, and 106. Alternatively, an interrupt is generated whenever a data packet has been sent from the computer host system to the network of computers.

In any case, when an interrupt is generated to the data processors 102, 104, and 106, one of those data processors 102, 104, and 106 services the interrupt. Servicing of the interrupt includes reading an appropriate interrupt register for information regarding the interrupt. The electronic system 100 includes a first interrupt register 112, a second interrupt register 114, and so on, up to an Nth interrupt register 116. The interrupt registers 112, 114, and 116 may be any type of data registers as known to one of ordinary skill in the art of digital system design.

When an interrupt is generated by an interrupt generating source, the address of a corresponding interrupt register is written to an address line 120. The corresponding interrupt register has information associated with that interrupt. An address decoder 122 decodes that address on the address line 120 such that information from the corresponding interrupt register is gated to a data bus 130. Thus, each output bit of an interrupt register is coupled to the data bus 130 via a tri-state buffer having an enable line coupled to an output line of the address decoder 122. The address decoder 122 selects the appropriate interrupt register having information associated with a particular interrupt. The address decoder 122 may be implemented in any way known to one of ordinary skill in the art of digital system design.

The plurality of data processors 102, 104, and 106 services an interrupt by reading the information from the data bus after the information is gated from the corresponding interrupt register for that interrupt onto the data bus 130. One of the data processors 102, 104, and 106 should service an interrupt. However, in a multiprocessor system, when an interrupt is generated, more than one data processor may attempt to service that interrupt with unpredictable results. Yet, including a system with a plurality of data processors is advantageous for faster service of interrupts.

Thus, a mechanism for synchronizing service of interrupts by a plurality of data processors in a multiprocessor system is desired.

SUMMARY OF THE INVENTION

Accordingly, a primary object of the present invention is to ensure that only one data processor performs operations associated with an interrupt register having information corresponding to a particular interrupt.

In a general aspect, the present invention synchronizes service of interrupts by a plurality of data processors. The present invention includes a decoder for decoding address and control signals to generate a read enable signal for steering at least one portion of data bits from an interrupt register to a data bus. The at least one portion of data bits is read by a first data processor from the data bus to service an interrupt during a prior at least one bus cycle. The present invention also includes a trailing edge detector, coupled to the decoder, for generating a clearing pulse at the trailing edge of the read enable signal. The clearing pulse clears the at least one portion of data bits within the interrupt register before a second data processor reads the at least one portion of data bits from the data bus for servicing the interrupt during a subsequent at least one bus cycle.

The second data processor, upon reading the at least one portion of data bits that have been cleared, is signaled to return to a foreground task since the interrupt has already been serviced by the first data processor.

The present invention may be used to particular advantage when the data bits within the interrupt register are grouped into a plurality of portions by interrupt data type. Alternatively, all data bits within the interrupt register are steered to the data bus for reading by the first data processor during the prior at least one bus cycle. In that case, all data bits within the interrupt register are cleared before the reading by the second data processor from the data bus during the subsequent at least one bus cycle.

In another aspect of the present invention, the at least one portion of data bits within the interrupt register is not cleared if an alternative address is used for selecting the at least one portion of data bits. This aspect of the present invention provides an option for clearing or not clearing the at least one portion of data bits within the interrupt register after a corresponding interrupt has been serviced.

These and other features and advantages of the present invention will be better understood by considering the following detailed description of the invention which is presented with the attached drawings.

BRIEF DESCRIPTION OF THE DRAWINGS

FIG. 2 shows a mechanism for synchronizing service of interrupts by the plurality of data processors of FIG. 1, according to the present invention;

FIG. 6 shows another embodiment of the present invention which provides an option for not clearing the data bits within an interrupt register after the data bits have been written to a data bus.

The figures referred to herein are drawn for clarity of illustration and are not necessarily drawn to scale. Elements having the same reference number in FIGS. 1–7 refer to elements having similar structure and function.

DETAILED DESCRIPTION

Figure 1:
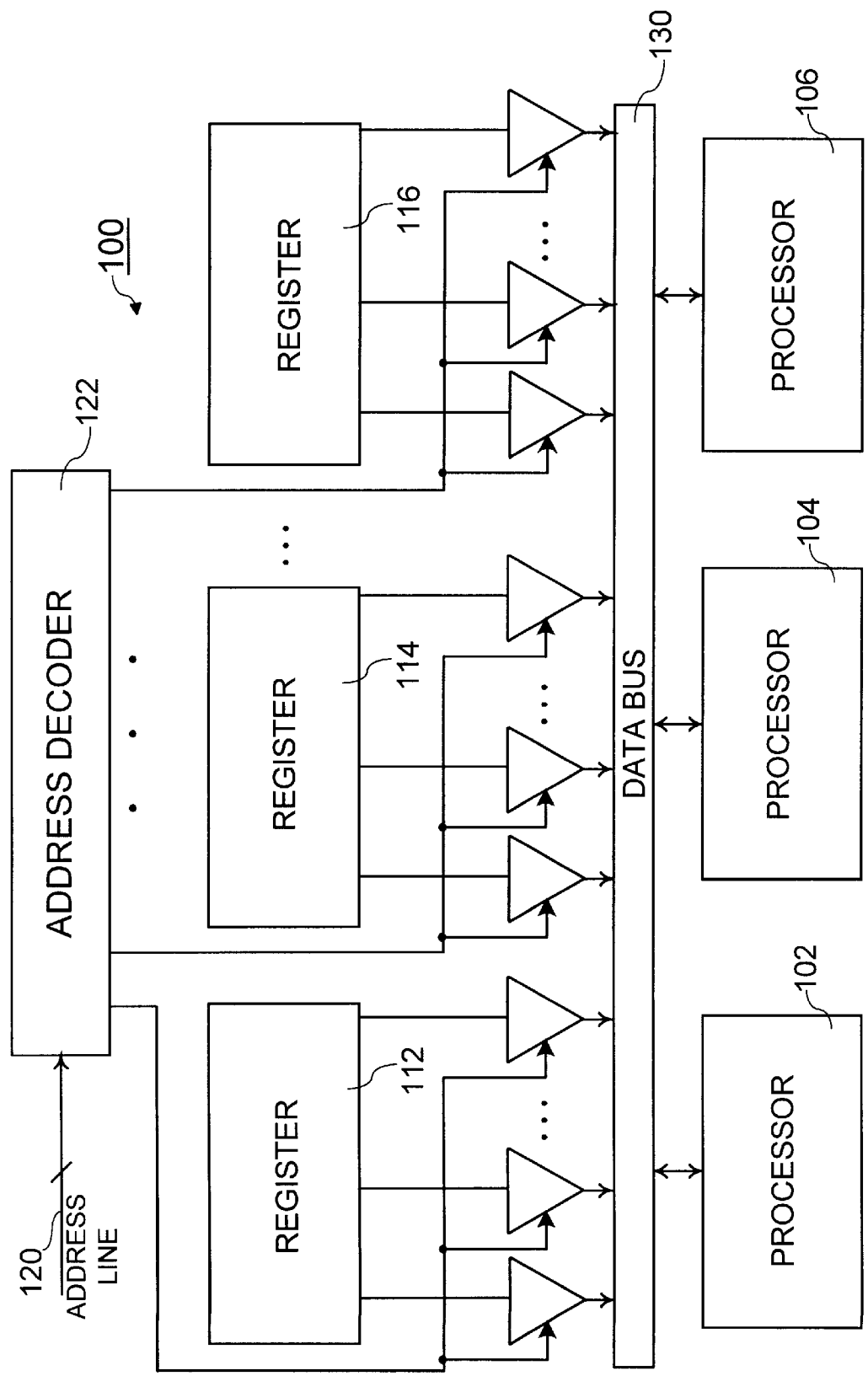
FIG. 1 shows a multiprocessor electronic system having a plurality of data processors for servicing interrupts and having interrupt registers containing information relating to interrupts, according to the prior art.

Referring to FIG. 2, the present invention includes a mechanism for synchronizing service of interrupts by the plurality of data processors 102, 104, and 108 of FIG. 1. More specifically, each interrupt register of FIG. 1 has an associated trailing edge detector according to the present invention. In FIG. 2, the mechanism of the present invention in association with only the first interrupt register 112 is shown for clarity of illustration. However, as would be apparent to one of ordinary skill in the art from the description herein, a similar mechanism may be included for every interrupt register in the electronic system of FIG. 1.

Referring to FIG. 2, the address decoder 122 decodes the address specified on the address line 120. When the address on the address line 120 selects the first interrupt register 112, the address decoder generates a respective read enable signal on a signal line 202 for the first interrupt register 112. The interrupt read signal on the signal line 202 enables a plurality of tri-state buffers 204 to couple the data bits from the first interrupt register 112 on to the data bus 130. Thus, the read enable signal steers the data bits within the first interrupt register 112 on to the data bus 130 when the first interrupt register is selected via the address line 120.

Then, one of the plurality of data processors 102, 104, and 106 in FIG. 1 reads the data bits that have been steered onto the data bus 130 for servicing an interrupt. These data bits provide information regarding that interrupt for proper operation in servicing that interrupt by one of the plurality of data processors 102, 104, and 106.

In a multiprocessor system having a plurality of data processors, more than one data processor may attempt to service the same interrupt with undesirable consequences. To avoid processing of the same interrupt by more than one data processor, the present invention includes a respective trailing edge detector associated with each interrupt register. In FIG. 2, a trailing edge detector 206 is associated with the first interrupt register 112.

The read enable signal on the signal line 202 is input to the trailing edge detector 206. The trailing edge detector 206 detects when the read enable signal changes its state from selecting the first interrupt register 112 to not selecting the first interrupt register 112. For example, if the read enable signal on the signal line 202 is high for selecting the first interrupt register 112, then the trailing edge detector 206 detects when the read enable signal on the signal line 202 turns back low.

Each interrupt register in FIG. 1 has a respective signal line with a respective read enable signal for indicating when that interrupt register has been selected. When an interrupt register is thus selected, the data bits from that interrupt register are steered onto the data bus 130. As different interrupt registers are selected with time, the respective read enable signals turn high and back low with time correspondingly.

Referring to FIG. 2, when the trailing edge detector 206 detects that the read enable signal on the signal line 202 corresponding to the first interrupt register 112 turns back low, the trailing edge detector 206 generates a clearing pulse at a reset line 208. The trailing edge detector is driven with a bus clock input 210 having a bus clock signal which also drives the data bus 130.

Figure 3:
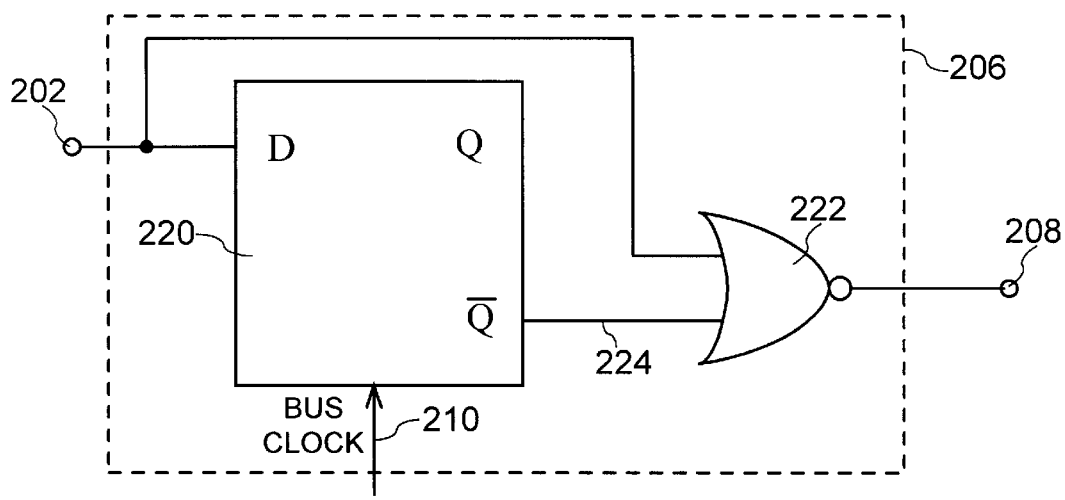
FIG. 3 shows an example implementation of the trailing edge detector of FIG. 2.

Referring to FIG. 3, an example implementation of the trailing edge detector 206 includes a D-flip-flop 220 and a NOR gate 222. The D-flip-flop 220 has the read enable signal on the signal line 202 as the D-input. The read enable signal on the signal line 202 is also input to the NOR gate 222. An inverse output with the inverted Q 224 from the D-flip-flop 220 is also input to the NOR gate 222.

Figure 4:
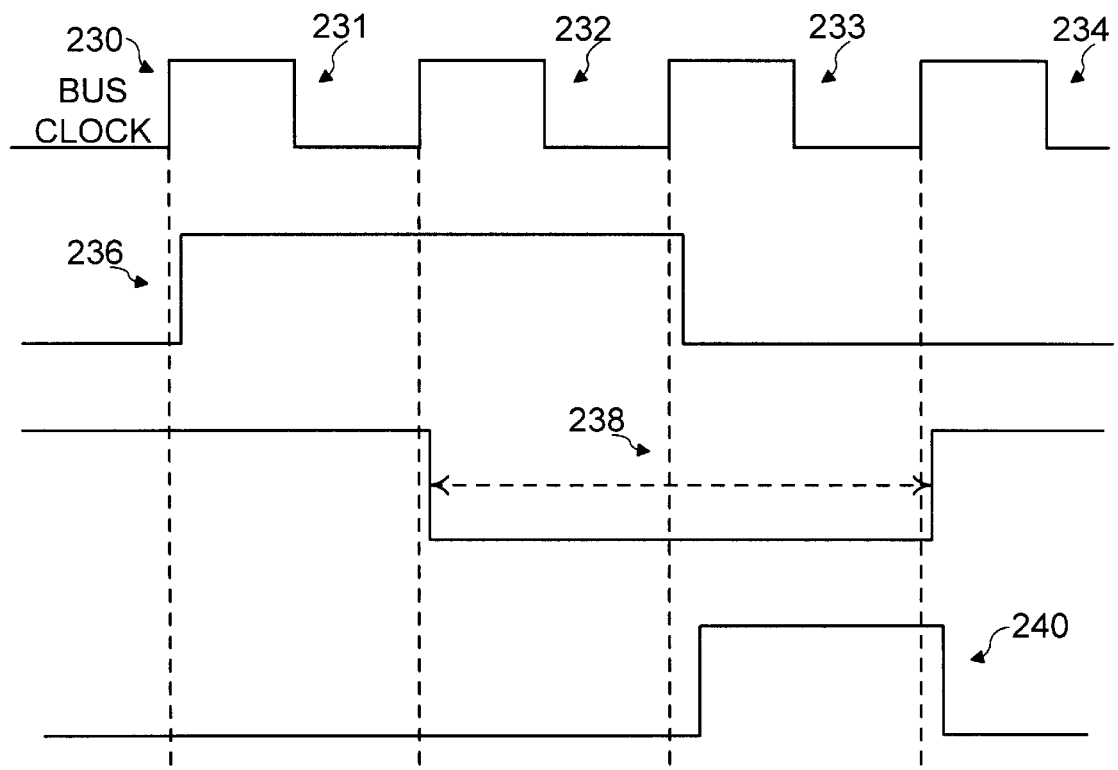
FIG. 4 shows a timing diagram of signals during operation of the trailing edge detector of FIG. 3.

Referring to FIG. 4, a timing diagram shows the signals during operation of the trailing edge detector 206 of FIG. 3. A bus clock signal 230 is input to the bus clock terminal 210 and has a first bus cycle 231, a second bus cycle 232, a third bus cycle 233, and a fourth bus cycle 234. In the example timing diagram of FIG. 4, the read enable signal 236 on the signal line 202 is high predominantly during the first and second bus cycles 231 and 232. The time duration when the read enable signal 236 is high depends on the speed constraints of the computer peripheral device and the host computer.

An inverse output signal 238 on the inverse output with the inverted Q 224 from the D-flip-flop 220 is the inverse of the read enable signal 236 delayed by one bus cycle. Thus, the inverse output signal 238 is low predominantly during the second and third bus cycles 232 and 233. The output of the NOR gate 222 produces a high clearing pulse 240 on the reset line 208 in FIG. 2 when the read enable signal 236 and the inverse output signal 238 are both low. (Note that the high clearing pulse 240 is shown with a slight propagation delay in FIG. 4.)

Figure 5:
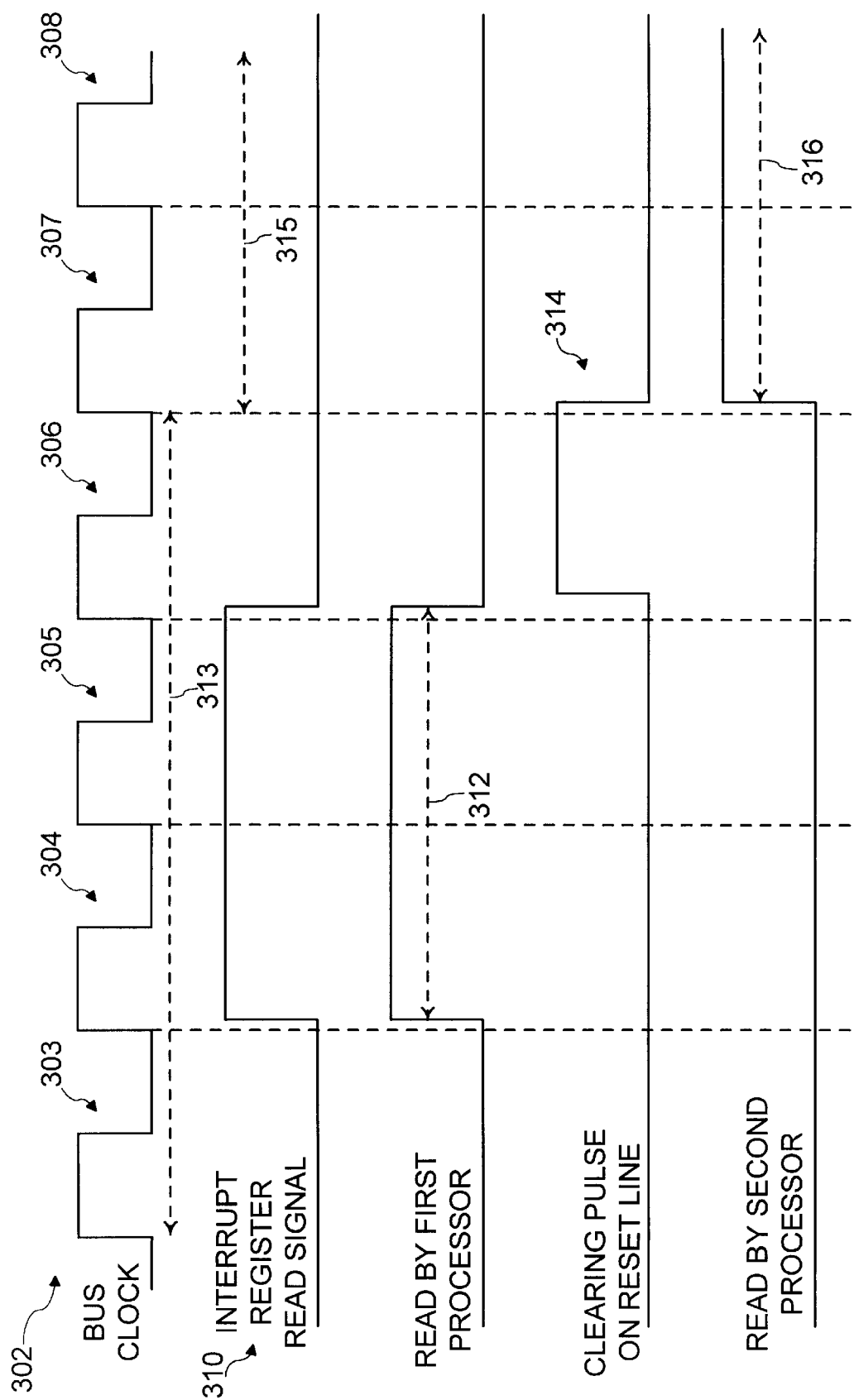
FIG. 5 shows a timing diagram of the operation of the mechanism of FIG. 2.

Referring to FIG. 5, a timing diagram illustrates the operation of the mechanism of FIG. 2. A periodic bus clock signal 302 has a first bus cycle 303, a second bus cycle 304, a third bus cycle 305, a fourth bus cycle 306, a fifth bus cycle 307, and an sixth bus cycle 308 in FIG. 5. A prior at least one bus cycle is comprised of the first bus cycle 303, the second bus cycle 304, the third bus cycle 305, and the fourth bus cycle 306 as indicated by dashed line 313 in FIG. 5. A subsequent at least one bus cycle includes the fifth bus cycle 307 and the sixth bus cycle 308 as indicated by dashed line 315 in FIG. 5.

The prior at least one bus cycle 313, when a first one of the plurality of processors reads a register, may include any number of bus cycles. In addition, the subsequent at least one bus cycle 315, when a second one of the plurality of processors reads the register, may include any number of bus cycles. The number of bus cycles in the prior at least one bus cycle 313 and the subsequent at least one bus cycle 315 depend on speed constraints of the computer peripheral device and the host computer. The present invention may be practiced with any number of bus cycles in the prior at least one bus cycle 313 and the subsequent at least one bus cycle 315 as would be apparent to one of ordinary skill in the art from the description herein.

Referring to FIG. 5, during the prior at least one bus cycle 313, an interrupt is generated, and an interrupt register read signal 310 (i.e., the read enable signal) on the signal line 202 turns high during the second bus cycle 304 and the third bus cycle 305 to steer the data bits within the first interrupt register 112 on to the data bus 130. While the data bits from the first interrupt register 112 are on the data bus 130, a first one of the plurality of data processors 102, 104, and 106 reads the data bits from the data bus 130 during a first read time period 312 for servicing the interrupt. The duration of the read time period 312 depends on the speed constraints of the first one of the data processors 102, 104, and 106 that reads the data bits from the data bus 130.

The read enable signal 310 eventually turns low after the beginning of the fourth bus cycle 306. The duration of the high state of the read enable signal 310 depends on the speed constraints of the peripheral device and the host computer. The trailing edge detector 206 detects when the read enable signal 310 turns back low. The trailing edge detector 206 is driven by the bus clock signal 302, and generates a clearing pulse 314 predominantly during the next bus cycle (i.e., the fourth bus cycle 306). The trailing edge detector 206 may be implemented as shown in FIGS. 2 and 3 or in any other way known to one of ordinary skill in the art of digital system design.

The clearing pulse 314 is applied to the reset line 208 which is coupled to a reset input of the first interrupt register 112. The clearing pulse resets the data content of the first interrupt register 112. For example, the data bits within the first interrupt register 112 may be reset to low states "0,0,0 . . ." with the clearing pulse 314. With the resetting of the first interrupt register 112, a second one of the plurality of data processors 102, 104, and 106 is precluded from servicing the same interrupt during the subsequent at least one bus cycle 315.

When the second one of the plurality of data processors attempts to read the data bus 130 during a second read period 316 in the subsequent at least one bus cycle 315, the content of the first interrupt register 112 has been reset such that the data bits on the data bus 130 are also reset. Thus, the second of the data processors reads "0,0,0 . . ." for example which indicates that the second of the data processors should return to its foreground task because another data processor has already serviced that interrupt.

In this manner, once the content of an interrupt register has been read via the data bus 130 by one data processor, the content of that interrupt register is cleared before another data processor attempts to read that content. When the latter data processor reads the cleared content, the latter data processor returns to its foreground task since the interrupt has already been serviced. Thus, more than one data processor within a multiprocessor system is precluded from servicing the same interrupt. In this manner, the present invention avoids undesirable consequences that result when more than one data processor within a multiprocessor system services the same interrupt.

In some situations, such as when debugging, it is advantageous if an interrupt register is not cleared after its data bits have been steered to the data bus 130. Referring to FIG. 6, the mechanism of FIG. 2 is enhanced to provide an option for not clearing an interrupt register. When an interrupt register should be cleared, a first address is specified on the address line 120 to indicate that the first interrupt register 112 should be cleared after the data bits are steered on to the data bus 130. When an interrupt register should not be cleared, a second address is specified on the address line 120 to indicate that the first interrupt register 112 should not be cleared after the data bits are steered on to the data bus 130.

When the first address is specified on the address line 120, a high read enable signal is generated on a first signal line 402. The first signal line 402 is coupled to the trailing edge detector 206 which clears the content of the first interrupt register 112 after the data bits from the first interrupt register 112 have been steered onto the data bus 130 and after one of the data processors 102, 104, and 108 has read those data bits from the data bus 130. The trailing edge detector 206 with the first signal line 402 operates as already described in connection with FIG. 2.

When the second address is specified on the address line 120, a high read enable signal is generated on a second signal line 404. The second signal line 404 and the first signal line 402 are inputs to an OR-gate 406. The output of the OR-gate 406 is coupled to the enable line of the plurality of tri-state buffers 204. Because the second signal line 404 is not coupled through any trailing edge detector, the content of the first interrupt register 112 is not cleared after its data bits are steered to the data bus 130 with a high read enable signal on the second signal line 404.

Figure 7:
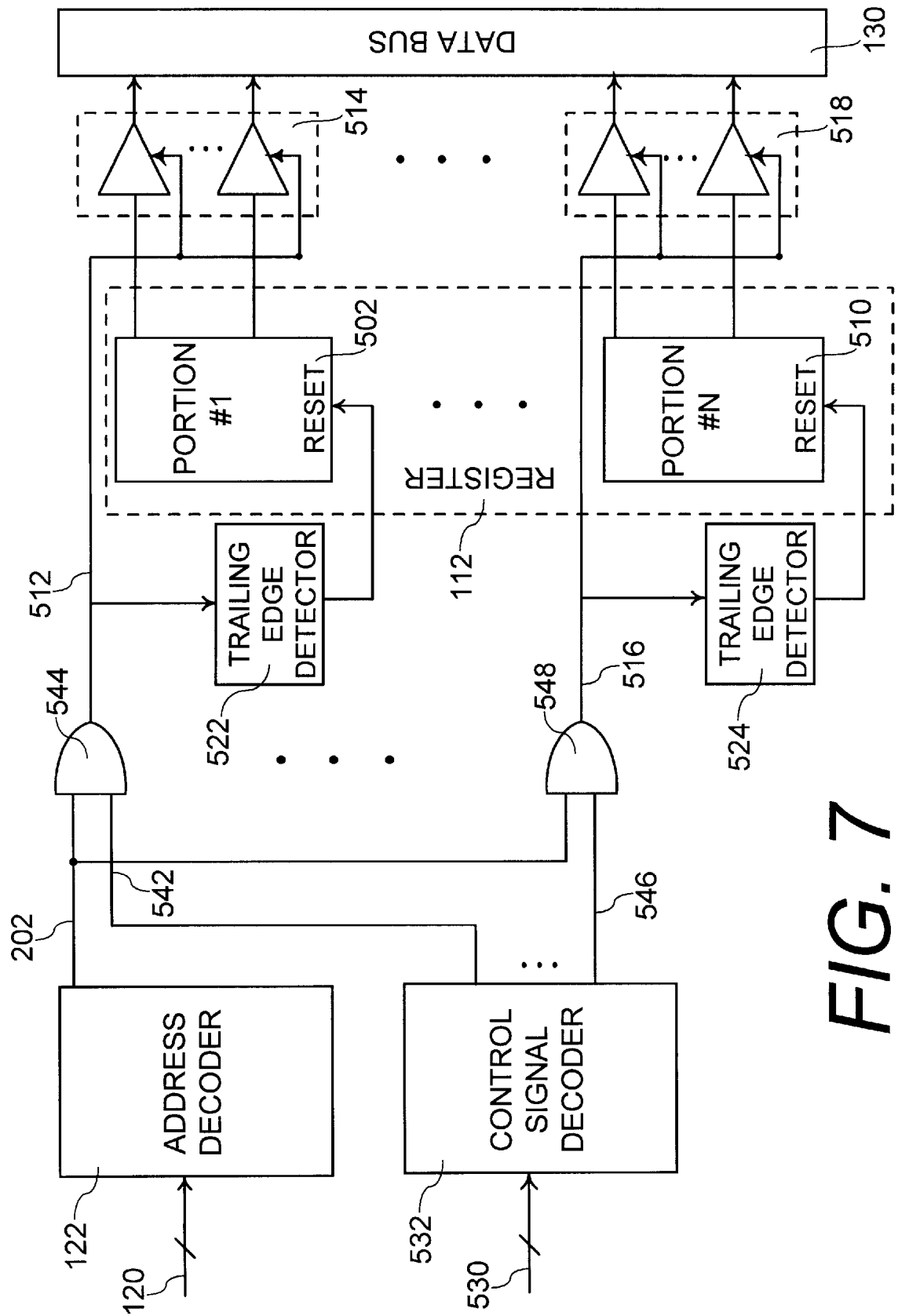
FIG. 7 shows an alternative embodiment of the present invention wherein data bits within an interrupt register are grouped into a plurality of portions by interrupt data type.

FIG. 7 shows an alternative embodiment of the present invention which allows a portion of the data bits within an interrupt register to be steered to the data bus 130 and to be cleared thereafter. In this embodiment, the first interrupt register 112 includes a first portion of data bits 502 and up to an Nth portion of data bits 510. Each portion of data bits has a respective read enable signal on a respective signal line. Each portion of data bits also has a respective trailing edge detector and a respective plurality of tri-state buffers for steering the portion of data bits onto the data bus 130.

Referring to FIG. 7, the first portion of data bits 502 has a first read enable signal on a first signal line 512 which is coupled to the enable line of a first plurality of tri-state buffers 514 for steering the first portion of data bits 502 onto the data bus 130. Similarly, the Nth portion of data bits 510 has an Nth read enable signal on an Nth signal line 516 which is coupled to the enable line of an Nth plurality of tri-state buffers 518 for steering the Nth portion of data bits 510 onto the data bus 130.

The first portion of data bits 502 has a first trailing edge detector 522 for clearing the data bits within the first portion 502 after one of the data processor 102, 104, and 106 reads the data bits of the first portion 502 from the data bus 130. Similarly, the Nth portion of data bits 510 has an Nth trailing edge detector 524 for clearing the data bits within the Nth portion 510 after one of the data processors 102, 104, and 106 reads the data bits of the Nth portion 510 from the data bus 130.

The register address on the address line 120 indicates which of the interrupt registers 112, 114, and 116 is selected for reading. The output of the address decoder 122 generates a selected register signal. An additional control signal on a control line 530 indicates which of the portions within an interrupt register is selected for reading. A control signal decoder 532 decodes the control signal on the control line 530 to provide portion read enable signals. Such portion read enable signals may be useful for example for reading an eight bit portion of an interrupt register since many types of microprocessors within a computer host system include a byte enable signal for reading eight bits. The control signal decoder 532 may be implemented in ways known to one of ordinary skill in the art of digital system design.

A respective portion read enable signal is provided for each of the data bit portions within the first interrupt register 112. Each portion read enable signal is input with the selected register signal from the address decoder to a respective AND-gate for each data bit portion.

Referring to FIG. 7, a first portion read enable signal 542 is input to a first AND-gate 544. The output of the first AND-gate 544 is the first read enable signal which is coupled to the enable line of the first plurality of tri-state buffers 514 and to the first trailing edge detector 522 which then operates as already described in association with FIG. 2. An Nth portion read enable signal 546 is input to an Nth AND-gate 548. The output of the Nth AND-gate 548 is the Nth read enable signal which is coupled to the enable line of the Nth plurality of tri-state buffers 518 and to the Nth trailing edge detector 524 which then operates as already described in association with FIG. 2.

In this manner, data bits within an interrupt register may be managed portion by portion at a time. In a computer network peripheral device which interfaces a host computer system to a network of computers, for example, a first portion of an interrupt register may contain data associated with a receive data packet interrupt. A first data processor within a multiprocessor system operates on the receive data packet interrupt from data within the first portion of that interrupt register. A second portion of that interrupt register may contain data associated with a transmit data packet interrupt. A second data processor within the multiprocessor system may then operate on the transmit data packet interrupt from data within the second portion of that interrupt register.

Thus, data within the interrupt register are grouped into a plurality of portions depending on data type. Such a mechanism may speed up data processing since a plurality of data types are stored in one interrupt register simultaneously instead of sequentially. Furthermore, having a mechanism for handling a plurality of data portions within an interrupt register may thus be particularly advantageous in a multiprocessor system. Because interrupt data for different types of interrupts are readily available within an interrupt register, a plurality of data processors may readily process through multiple interrupts.

The foregoing is by way of example only and is not intended to be limiting. For example, the present invention may be implemented for any number of data bits within an interrupt register, for any number of interrupt registers, for any number of data portions within an interrupt register, and for any number of data processors in the multiprocessor system, as would be apparent to one of ordinary skill in the art of digital system design from the description herein. The invention is limited only as defined in the following claims and equivalents thereof.

We claim:

1. A method for synchronizing service of interrupts by a plurality of data processors, the method including the steps of:

A. generating a read enable signal for steering at least one portion of data bits from an interrupt register to a data bus for reading of the at least one portion of data bits by a first data processor from the data bus to service an interrupt during a prior at least one bus cycle; and B. clearing the at least one portion of data bits within the interrupt register before a second data processor reads the at least one portion of data bits within the interrupt register for servicing the interrupt during a subsequent at least one bus cycle;

wherein the second data processor, upon reading the at least one portion of data bits that have been cleared during said subsequent at least one bus cycle, returns to a foreground task.

2. The method of claim 1, wherein all data bits within the interrupt register are steered to the data bus for reading by the first data processor during the prior at least one bus cycle, and wherein all data bits within the interrupt register are cleared before the reading by the second data processor during the subsequent at least one bus cycle.

3. The method of claim 1, wherein the data bits within the interrupt register are grouped into a plurality of portions by interrupt data type.

4. The method of claim 1, wherein step B further comprises the steps of:

clearing the at least one portion of data bits within the interrupt register after steering the at least one portion of data bits to the data bus if a first address is used for selecting the at least one portion of data bits; and not clearing the at least one portion of data bits within the interrupt register after steering the at least one portion of data bits to the data bus if a second address is used for selecting the at least one portion of data bits.

5. The method claim 1, wherein step A further includes the step of:

decoding address and control signals for setting the read enable signal when the at least one portion of data bits has been selected for steering to the data bus;

and wherein step B further includes the steps of:

detecting a trailing edge of the read enable signal to generate a clearing pulse;

applying the clearing pulse to a reset input of the interrupt register; and driving the interrupt register with a bus clock that also drives the data bus such that the at least one data bit portion of the interrupt register is cleared synchronously with the bus clock.

6. The method of claim 1, wherein the interrupts are generated by a computer network peripheral device which interfaces a computer host system, having the plurality of data processors, to a network of computers.

7. A method for synchronizing service of interrupts by a plurality of data processors, the method including the steps of:

generating a read enable signal for steering at least one portion of data bits from an interrupt register to a data bus for reading of the at least one portion of data bits by a first data processor from the data bus to service an interrupt during a prior at least one bus cycle;

clearing the at least one portion of data bits within the interrupt register after steering the at least one portion of data bits to the data bus if a first address is used for selecting the at least one portion of data bits; and not clearing the at least one portion of data bits within the interrupt register after steering the at least one portion of data bits to the data bus if a second address is used for selecting the at least one portion of data bits.

8. An apparatus for synchronizing service of interrupts by a plurality of data processors, the apparatus comprising:

a decoder for decoding address and control signals to generate a read enable signal for steering at least one portion of data bits from an interrupt register to a data bus for reading of the at least one portion of data bits by a first data processor from the data bus to service an interrupt during a prior at least one bus cycle; and a trailing edge detector, coupled to the decoder, for generating a clearing pulse at a trailing edge of the read enable signal for clearing the at least one portion of data bits within the interrupt register before a second processor reads the at least one portion of data bits within the interrupt register for servicing the interrupt during a subsequent at least one bus cycle;

wherein the second data processor, upon reading the at least one portion of data bits that have been cleared during said subsequent at least one bus cycle, returns to a foreground task.

9. The apparatus of claim 8, wherein the clearing pulse is applied to a reset of the interrupt register and wherein the interrupt register is driven by a bus clock that drives the data bus.

10. The apparatus of claim 8, wherein all data bits within the interrupt register are steered to the data bus for the reading by the first data processor during the prior at least one bus cycle, and wherein all data bits within the interrupt register are cleared before the reading by the second data processor during the subsequent cycle.

11. The apparatus of claim 8, wherein the data bits within the interrupt register are grouped into a plurality of portions by interrupt data type.

12. The apparatus of claim 8, wherein the trailing edge detector generates the clearing bit at the trailing edge of the read enable signal if a first address is used for selecting the at least one portion of data bits, and wherein the trailing edge detector does not generate the clearing bit at the trailing edge of the read enable signal if a second address is used for selecting the at least one portion of data bits.

13. The apparatus of claim 8, wherein the interrupts are generated by a computer network peripheral device which interfaces a computer host system, having the plurality of data processors, to a network of computers.

14. An apparatus for synchronizing service of interrupts by a plurality of data processors, the apparatus comprising:

a decoder for decoding address and control signals to generate a read enable signal for steering at least one portion of data bits from an interrupt register to a data bus for reading of the at least one portion of data bits by a first data processor from the data bus to service an interrupt during a prior at least one bus cycle; and a trailing edge detector, coupled to the decoder, for generating a clearing pulse at a trailing edge of the read enable signal for clearing the at least one portion of data bits within the interrupt register after steering the at least one portion of data bits to the data bus if a first address is used for selecting the at least one portion of data bits, the trailing edge detector not generating the clearing pulse if a second address is used for selecting the at least one portion of data bits.

15. An apparatus for synchronizing service of interrupts by a plurality of data processors, the apparatus comprising:

means for generating a read enable signal for steering at least one portion of data bits from an interrupt register to a data bus for reading of the at least one portion of data bits by a first data processor from the data bus to service an interrupt during a prior at least one bus cycle; and means for clearing the at least one portion of data bits within the interrupt register before a second data processor reads the at least one portion of data bits within the interrupt register for servicing the interrupt during a subsequent at least one bus cycle;

wherein the second data processor, upon reading the at least one portion of data bits that have been cleared during said subsequent at least one bus cycle, returns to a foreground task.

16. The apparatus of claim 15, wherein the means for clearing further includes:

means for clearing the at least one portion of data bits within the interrupt register after steering the at least one portion of data bits to the data bus if a first address is used for selecting the at least one portion of data bits; and means for not clearing the at least one portion of data bits within the interrupt register after steering the at least one portion of data bits to the data bus if a second address is used for selecting the at least one portion of data bits.

17. The apparatus of claim 15, wherein the means for generating a read enable signal further includes:

a decoder for decoding address and control signals to generate the read enable signal.

18. The apparatus of claim 17, wherein the means for clearing further includes:

a trailing edge detector, coupled to the decoder, for generating a clearing pulse at a trailing edge of the read enable signal for clearing the at least one portion of data bits within the interrupt register before the second processor reads the at least one portion of data bits within the interrupt register for servicing the interrupt during the subsequent at least one bus cycle.

* * * * *